US010851835B2

(12) United States Patent
Zhang et al.

(10) Patent No.: US 10,851,835 B2
(45) Date of Patent: Dec. 1, 2020

(54) STATOR ASSEMBLY OF A MAGNETIC SUSPENSION BEARING AND MANUFACTURING METHOD

(71) Applicant: Gree Green Refrigeration Technology Center Co., Ltd. of Zhuhai, Zhuhai (CN)

(72) Inventors: Fang Zhang, Zhuhai (CN); Jianning Liu, Zhuhai (CN); Jinxin Jia, Zhuhai (CN); Xiaobo Zhang, Zhuhai (CN); Chengbao Zhong, Zhuhai (CN); Siyuan Tian, Zhuhai (CN); Gao Gong, Zhuhai (CN); Guanghai Li, Zhuhai (CN); Changguang Guo, Zhuhai (CN)

(73) Assignee: Gree Green Refrigeration Technology Center Co., Ltd. of Zhuhai, Zhuhai (CN)

( * ) Notice: Subject to any disclaimer, the term of this patent is extended or adjusted under 35 U.S.C. 154(b) by 221 days.

(21) Appl. No.: 15/774,118

(22) PCT Filed: Nov. 22, 2016

(86) PCT No.: PCT/CN2016/106759
§ 371 (c)(1),
(2) Date: May 7, 2018

(87) PCT Pub. No.: WO2017/101640
PCT Pub. Date: Jun. 22, 2017

(65) Prior Publication Data
US 2018/0306239 A1    Oct. 25, 2018

(30) Foreign Application Priority Data

Dec. 14, 2015  (CN) .......................... 2015 1 0929688

(51) Int. Cl.
*H02K 7/09*         (2006.01)
*H02K 3/52*         (2006.01)
(Continued)

(52) U.S. Cl.
CPC ........ *F16C 32/0478* (2013.01); *F16C 32/044* (2013.01); *F16C 32/0476* (2013.01);
(Continued)

(58) Field of Classification Search
CPC ...... F16C 32/0478; F16C 33/00; F16C 43/00; F16C 32/044; F16C 32/0476;
(Continued)

(56) References Cited

U.S. PATENT DOCUMENTS 5,618,167 A    4/1997  Hirakawa et al.
6,519,273 B2   2/2003  Sekiguchi et al.
(Continued)

FOREIGN PATENT DOCUMENTS

CN    101394111 A    3/2009
CN    101581336 A    11/2009
(Continued)

OTHER PUBLICATIONS

Machine Translation, Fukuda, JP-2009177985-A, Aug. 2009. (Year: 2009).*

*Primary Examiner* — Thomas Truong
(74) *Attorney, Agent, or Firm* — The Webb Law Firm

(57) ABSTRACT

The present disclosure relates to a stator assembly of a magnetic suspension bearing and a manufacturing method, wherein the stator assembly includes stator cores, coils and two stator core frames, two of the stator core frames being respectively engaged at both ends of the stator core along an axial direction thereof, wherein a concave portion is provided at an engaged end of one of the stator core frames, and a convex portion is provided at an engaged end of the other (Continued)

of the stator core frames, the concave portion and the convex portion are engaged with each other, and each of the coils is wound correspondingly to teeth of the stator cores.

12 Claims, 6 Drawing Sheets

(51) Int. Cl.
- *H02K 15/02* (2006.01)
- *F16C 32/04* (2006.01)
- *F16C 33/00* (2006.01)
- *F16C 43/00* (2006.01)
- *H02K 1/14* (2006.01)

(52) U.S. Cl.
CPC .............. *F16C 33/00* (2013.01); *F16C 43/00* (2013.01); *H02K 1/146* (2013.01); *H02K 3/522* (2013.01); *H02K 7/09* (2013.01); *H02K 15/022* (2013.01); *H02K 2203/03* (2013.01)

(58) Field of Classification Search
CPC .. F16C 32/047; F16C 32/0474; F16C 32/048; H02K 1/146; H02K 3/522; H02K 7/09; H02K 15/022; H02K 2203/03; H02K 3/32; H02K 3/325; H02K 3/34; H02K 3/345; H02K 5/22; H02K 5/225
USPC .......................................... 310/71, 214, 215
See application file for complete search history.

(56) References Cited

U.S. PATENT DOCUMENTS

| | | | |
|---|---|---|---|
| 6,559,568 B2 | 5/2003 | Maejima et al. | |
| 2009/0324435 A1* | 12/2009 | Sears | H02K 3/522 417/423.7 |
| 2010/0264774 A1* | 10/2010 | Tokunaga | H02K 3/522 310/215 |
| 2011/0109189 A1* | 5/2011 | Taema | H02K 3/345 310/215 |
| 2013/0057095 A1* | 3/2013 | Okinaga | H02K 3/522 310/71 |

FOREIGN PATENT DOCUMENTS

| | | |
|---|---|---|
| CN | 101919141 A | 12/2010 |
| CN | 102420469 A | 4/2012 |
| CN | 103195806 A | 7/2013 |
| CN | 103683576 A | 3/2014 |
| CN | 105317839 A | 2/2016 |
| CN | 205207432 U | 5/2016 |
| EP | 0694699 A1 | 1/1996 |
| EP | 1115194 A2 | 7/2001 |
| EP | 1128079 A2 | 8/2001 |
| EP | 1312822 A2 | 5/2003 |
| JP | 2008182823 A | 8/2008 |
| JP | 2009177985 A * | 8/2009 |

* cited by examiner

STATOR ASSEMBLY OF A MAGNETIC SUSPENSION BEARING AND MANUFACTURING METHOD

CROSS-REFERENCE TO RELATED APPLICATIONS

This application is the United States national phase of International Application No. PCT/CN2016/106759 filed Nov. 22, 2016 and claims priority to Chinese Patent Application No. 201510929688.6 filed Dec. 14, 2015, the entire disclosures of which are hereby incorporated in their entirety by reference.

FIELD OF THE DISCLOSURE

The present disclosure relates to the technical field of engineering machinery, and especially relates to a stator assembly of a magnetic suspension bearing and a manufacturing method thereof.

BACKGROUND OF THE DISCLOSURE

A magnetic suspension bearing utilizes magnetic action to suspend a rotor in the air, so that there is no mechanical contact between the rotor and a stator. Compared with conventional and sliding bearings and the like, the magnetic suspension bearing is absent with mechanical contact, so that the rotor can run to a high rotation speed, and there are advantages such as less mechanical wear, lower noise and longer service life without requiring lubrication. Therefore, the magnetic suspension bearing may he used in the motor.

A magnetic suspension bearing which is similar to the motor in structure, mainly utilizes an electromagnet installed on a stand to induce a magnetic field in the rotating rotor and suspend the rotor by the interaction of the stator with the magnetic field of the rotor, which avoids the mechanical problems produced by contact friction of the rotary shaft and the bearing of the conventional motor, so that the rotation speed of the motor may not he limited by the bearing. An insulation frame may be required between the stator core and the coil winding. For an ordinary magnetic suspension bearing motor, it may depend on an insulation trough sheet without using a frame, or uses a conventional and separated insulation frame. Next, these two types of insulation frames will be introduced respectively.

FIG. 1A shows an insulation frame, i.e. an end insulating frame, placed at an end of the motor for insulating the coil winding from the stator core. Since the troughs between adjacent teeth of the stator core may need to be insulated, and such insulation frame structure may not be able to produce the effect of trough insulation, there may be a need to place a trough sheet within the core troughs to insulate the core troughs and the coil packages. Moreover, in order to lead out an end of each coil, it may be necessary to design the wiring at an end of the insulation frame.

FIG. 1B shows a separated insulation frame, which divides the insulation frame into a plurality of independent separated bodies according to the number of the troughs of the motor. Such structure may be applied to a motor of a chain or modular structure.

For the aforementioned two structures, there may be a need to cooperate together with the insulation trough sheet in use. In the winding process, the trough sheet may be moved and there is a great potential safety hazard. Furthermore, there may be a need to perform leading at an end face of the insulation frame, and provide a structure such as a threading buckle so that the axial dimension of the stator assembly exceeds the required range, and it may also result in problems such as insufficient strength and disordered connection of the threading buckle, which all makes the structure and connection of each frame comparatively complicated, and difficult to ensure the quality of the stator assembly. If a separated structure is used, the assembly may be rather cumbersome, and the efficiency may be low.

SUMMARY OF THE DISCLOSURE

In order to overcome the above technical defects, the technical problem solved by the present disclosure is to provide a stator assembly of a magnetic suspension bearing and a manufacturing method, which can improve the reliability of the insulation of the stator core frame and reduce the assembly difficulty of the stator assembly.

In order to achieve the aforementioned object, a first aspect of the present disclosure provides a stator assembly of a magnetic suspension bearing, which comprises stator cores, coils and two stator core frames, two of the stator core frames being respectively engaged at both ends of the stator core along an axial direction thereof, wherein a concave portion is provided at an engaged end of one of the stator core frames, and a convex portion is provided at an engaged end of the other of the stator core frames, the concave portion and the convex portion are engaged with each other, and each of the coils is wound correspondingly on each teeth of the stator core.

Further, a concave portion and a convex portion may be provided at the engaged end of each of the stator core frames, wherein the concave portion and the convex portion on the engaged ends of two of the stator core frames are arranged in the same form.

Further, the stator core frame may comprise an annular substrate, and a plurality of tooth insulations spacedly provided on an inner circumference of the annular substrate, wherein the plurality of tooth insulations correspond to one of the teeth on the stator core, for surrounding a circumferential surface of the teeth, and the adjacent tooth insulations are connected to each other to form a trough insulation to surround a surface of a trough between the adjacent teeth.

Further, each of the tooth insulations may include: a cladding portion and a blocking portion, wherein the cladding portion is a folded sheet structure having an inner surface configured to be adapted to a circumferential surface of the teeth, and having one end surface provided on an inner circumference of the annular substrate along a radial direction of the stator core frame, and the blocking portion is provided on the other end face of the folded sheet structure along a radial direction of the stator core frame to block the coils wound on an outer surface of the folded sheet structure.

Further, the blocking portion may be adapted to the folded sheet structure in shape and higher than the outer surface of the folded sheet structure, wherein a circle is enclosed by an inner side of each of the blockings.

Further, a length of the folded sheet structure along a radial direction of the stator core frame may be the same as a tooth height of the teeth.

Further, the adjacent tooth insulations may be connected by an attachment portion, the attachment portion is a sheet structure adapted to the trough in shape, wherein the trough insulation is formed by the sheet structure and lateral sides of two adjacent the tooth insulations.

Further, the stator core frame may include an installation positioning pin, the installation positioning pin is provided on the annular substrate for mating with a positioning hole on the stator core.

Further, each of the coils may be wound on the outer surfaces of two of the tooth insulations which are engaged with each other.

Further, the stator assembly of a magnetic suspension bearing may comprise a circuit board, which is provided at an end of one of the stator core frames, for connecting the ends of each of the coils.

Further, the stator assembly of a magnetic suspension bearing may comprise a lead-out hub, which is provided on the circuit board for providing an interface for supplying power to the coils by means of the circuit board.

Further, a conductive sheet insertion hole may be provided at one end of the stator core frame opposite to an engaged end, wherein the stator assembly further comprises a conductive sheet which is provided within the conductive sheet insertion hole, with one end connected to the end of the coil and the other end connected to the circuit board.

Further, a circuit board positioning pin may be provided at one end of the stator core frame opposite to the engaged direction, for positioning the circuit board.

A second aspect of the present disclosure provides a method of manufacturing a stator assembly of a magnetic suspension bearing, which comprises the following steps:

Engaging two of the stator core frames respectively at both ends of the stator core along an axial direction thereof;

winding the coils on each of a plurality of teeth of the stator core sequentially;

providing a circuit board, and connecting ends of each of the coils to the circuit board;

fixing the circuit board at an outer end of one of the stator core frames.

Based on the aforementioned technical solution, the stator assembly of a magnetic suspension bearing according to the embodiments of the present disclosure, engages two stator core frames respectively at both ends of the stator core to realize the insulation from the coils, and provides the structure that a concave portion and a convex portion cooperate with each other at an engaged end of the two stator core frames, such that the stator assembly is easy to assemble. After installation, these two stator core frames which may be in full fit and firm assembly without the circumstance that the trough sheet of the conventional frame is moved and dislocated when the coils are wound, can ensure the reliability of the insulation. Moreover, these two stator core frames which may use completely the same structure with significantly universal portions, can be interchanged in the assembly process, and at the same time can also reduce the molding expense, so that it is easy to achieve the standardization.

BRIEF DESCRIPTION OF THE DRAWINGS

The drawings described herein are used to provide a further understanding of the present disclosure and constitute a portion of the present application. The illustrative embodiments of the present disclosure as well as the descriptions thereof, which are used for explaining the present disclosure, do not constitute improper definitions on the present disclosure. In the drawings.

DESCRIPTION OF THE INVENTION

The present disclosure will be described in detail below. In the following paragraphs, different aspects of the embodiments are defined in more detail. The various aspects thus defined may be combined with any other aspect or aspects unless specifically indicated. In particularly, any feature believed to be preferred or advantageous may be considered to a combination of features believed to be preferred or advantageous with one or more other features.

The terms such as "first" and "second" recited in the present disclosure are only for the convenience of description, so as to distinguish different constituent portions having the same term rather than presenting a sequential or dominant relation.

In the description of the present disclosure, it is necessary to understand that, the azimuth or positional relations indicated by the terms "up", "down", "front", "rear", "outer", "inner", "vertical" and "horizontal", which are based on the azimuth or positional relations illustrated by the drawings, are only for facilitating description of the present disclosure, rather than indicating or implying that the device referred to has to present a particular position, and be constructed and operated in a particular position, so that it cannot be understood as limiting the protection scope of the present disclosure.

The magnetic suspension bearing is supported by a magnetic force produced between the stator assembly and the rotor assembly. Because there is no mechanical contact, the rotor may be enabled to obtain a high running speed, and has the advantages such as less mechanical wear, lower noise and longer service life without requiring lubrication.

Figure 9:
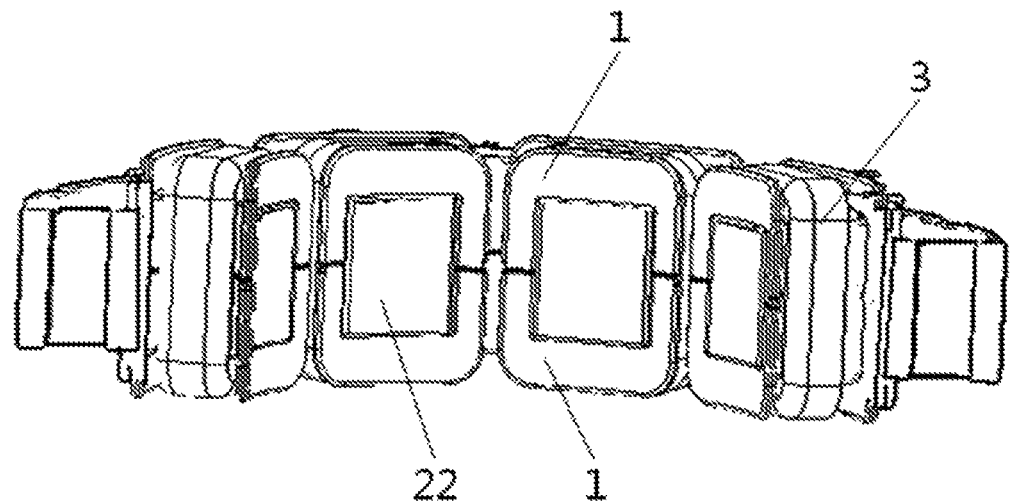
FIG. 9 is a schematic view of the semi-sectional structure of the stator assembly as shown in FIG. 7 after winding.
Figure 10:
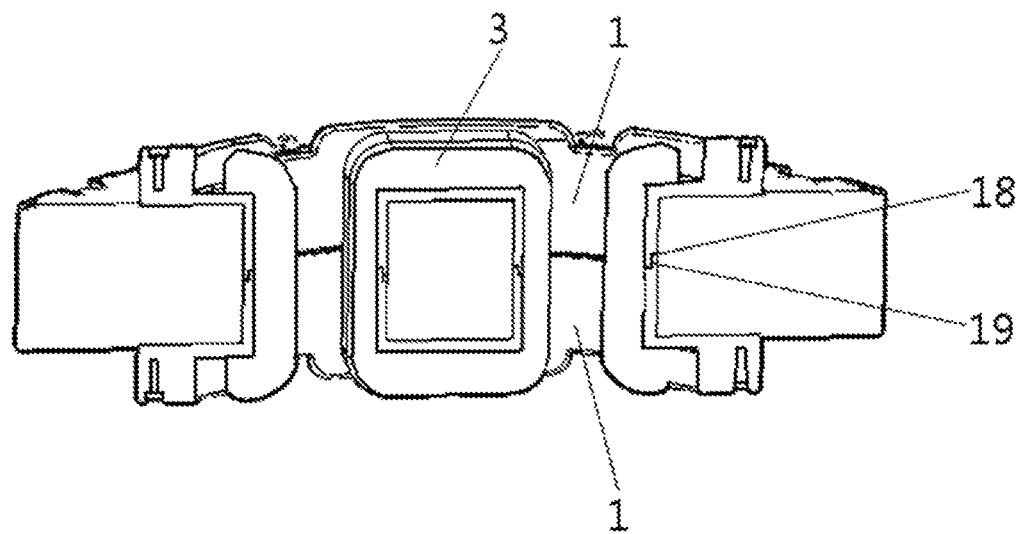
FIG. 10 is a schematic view of the structure of the sectional coil of the stator assembly as shown in FIG. 7 after winding.

The present disclosure improves the structure of the stator assembly in the magnetic suspension bearing. In some embodiments, referring to the structure shown in FIGS. 2 to 9, the stator assembly of a magnetic suspension bearing comprises stator cores 2, a plurality of coils 3 and two stator core frames 1, and two of the stator core frames 1 are respectively engaged at both ends of the stator core 2 along an axial direction thereof. With reference to FIG. 10, wherein a concave portion 18 is provided at an engaged end of one of the stator core frames 1, and a convex portion 19 is provided at an engaged end of the other of the stator core frames 1, the concave portion 18 and the convex portion 19 are engaged with each other, and each of the coils 3 is wound correspondingly on each of the teeth 22 of the stator core 2.

The stator assembly of a magnetic suspension bearing according to the embodiments of the present disclosure, engages two stator core frames respectively at both ends of the stator core to realize the insulation from the coils, and provides at an engaged end of the two stator core frames such a structure that a concave portion and a convex portion cooperate with each other, such that the stator assembly is easy to assemble. After installation, these two stator core frames may be in full fit and firm assembly. In this way, it is beneficial to clad the stator core more reliably without the circumstance that the trough sheet of the conventional frame is moved and dislocated when the coils are wound, such that the process of winding the coils is stable and reliable, and it is possible to ensure the reliability of the insulation.

In some embodiments, the concave portion 18 is provided at the engaged end of one of the stator core frames 1 corresponding to each of teeth 22, and the convex portion 19 is provided at the engaged end of the other stator core frame 1 corresponding to each tooth 22.

In some embodiments, the concave portion 18 and the convex portion 19 are simultaneously provided at the engaged end of each of the stator core frames 1, wherein the concave portion 18 and the convex portion 19 on the engaged ends of two of the stator core frames 1 are arranged in the same form. Accordingly, different combinations of concave- convex mated structures may be provided. Taking an 8-tooth core for example, it is possible to use a convex-concave-convex-concave-convex-concave-convex-concave structure to realize a fit assembly of two identical stator core frames 1, or it is possible to use a convex-convex-convex-convex-concave-concave-concave-concave structure to realize a fit assembly of two identical stator core frames 1 or other possible combinations. In the stator assembly of a magnetic suspension bearing according to the embodiment, these two stator core frames 1 which may use completely the same structure with universal portions, can be interchanged in the assembly process, and at the same time can also reduce the molding expense, so that it is easy to achieve the standardization of the portions.

Embodiments of the stator core frame 1 will be described below. In some embodiments, the stator core frame 1 is mounted at both ends of the stator core 2 shown in FIG. 5 to achieve the insulation from the coils 3, and the stator core 2 has an annular core body 21, and a plurality of teeth 22 are uniformly provided on an inner circumference of the annular core body 21, for example, eight teeth 22, and a trough 23 is formed between the adjacent teeth 22. With reference to FIG. 2 to 4B, the stator core frame 1 may comprise an annular substrate 11, and a plurality of tooth insulations 12 spacedly provided on an inner circumference of the annular substrate 11, wherein each tooth insulations 12 corresponds to one of the teeth 22 on the stator core 2, for surrounding a circumferential surface of the teeth 22, and the adjacent tooth insulations 12 are connected with each other to form a trough insulation 13, for surrounding a surface of a trough 23 between the adjacent teeth 22.

In this way, the two stator core frames 1 are engagingly mounted on both ends of the stator core 2 along the axial direction thereof, so that the area of the stator core 2 required to be insulated from the coils 3 can be completely cladded, so as to achieve electrical insulation of the stator core 2 from the coils 3. Moreover, as the stator core frame 1 itself is in simple structure, if the same stator core frame 1 is used at both ends, the molding expense can also be reduced. Further, the structure is easy to assemble. After installation, these two stator core frames 1 may be in full fit and firm assembly without the circumstance that the trough sheet is moved and dislocated as in the conventional insulation frame when the coils are wound, thereby further ensuring the reliability of the insulation.

Figure 1A:
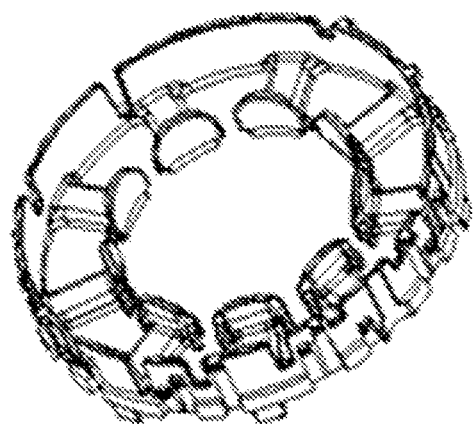
FIG. 1A is a schematic view of the structure of an insulation frame in the prior art.
Figure 1B:
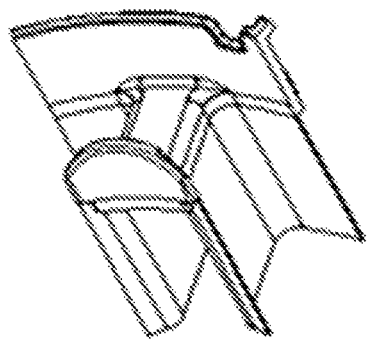
FIG. 1B is a schematic view of the structure of a separated insulation frame in the prior art.
Figure 2:
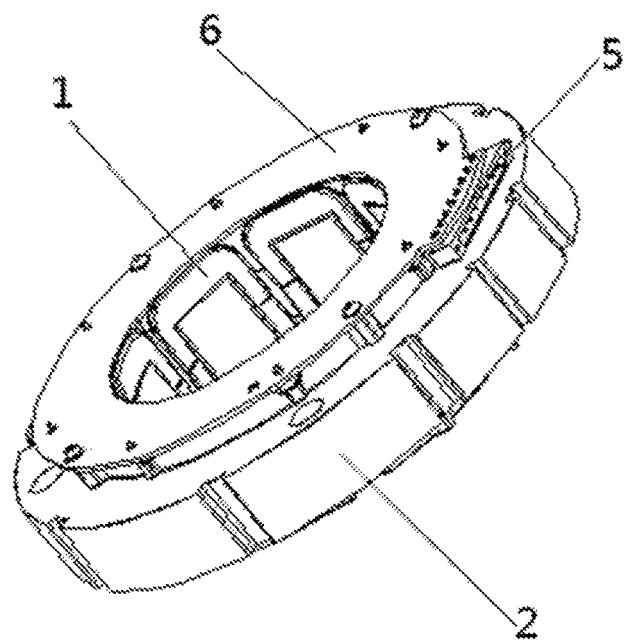
FIG. 2 is a schematic view of the structure of one embodiment of the stator assembly of a magnetic suspension bearing of the present disclosure.
Figure 3:
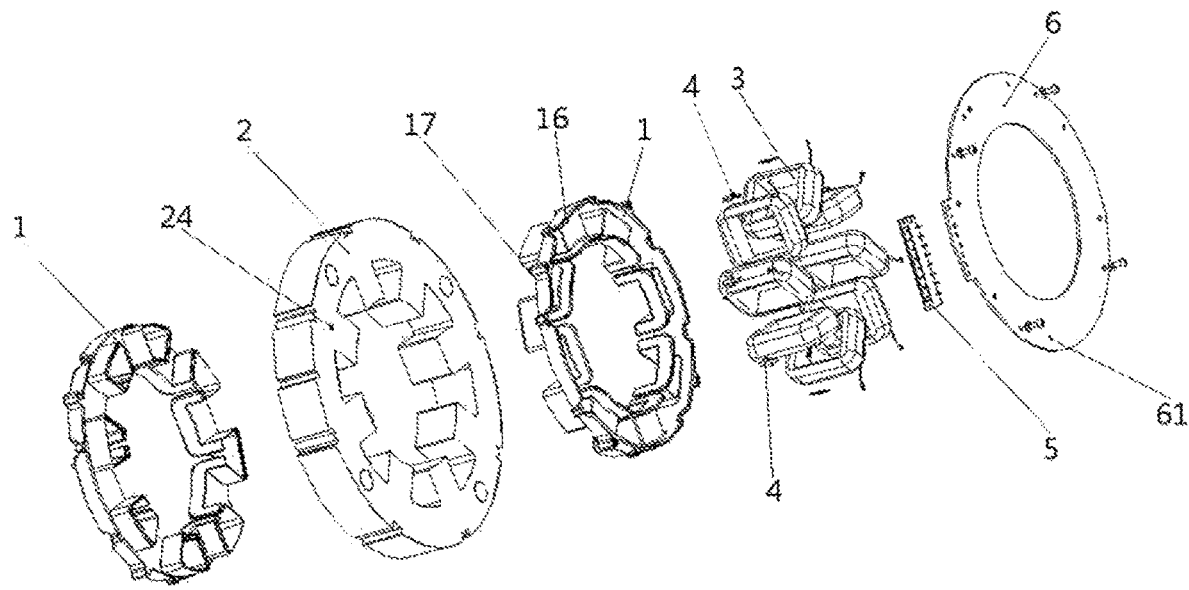
FIG. 3 is a schematic view of the exploded structure of the stator assembly of a magnetic suspension bearing as shown in FIG. 2.
Figure 4A:
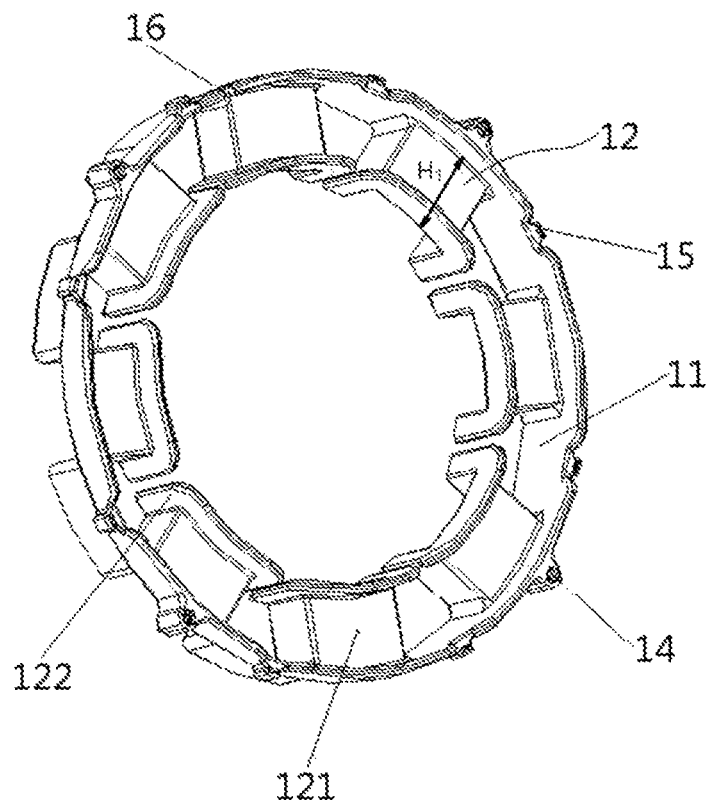
FIG. 4A is a schematic view of the front structure of one embodiment of the stator core frame in the stator assembly of a magnetic suspension bearing of the present disclosure.
Figure 4B:
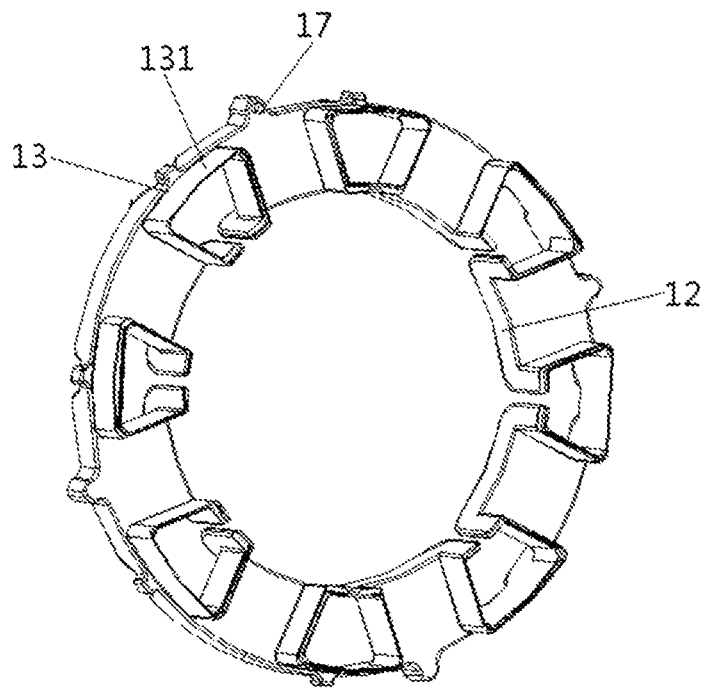
FIG. 4B is a schematic view of the rear structure of one embodiment of the stator core frame in the stator assembly of a magnetic suspension bearing of the present disclosure.
Figure 5:
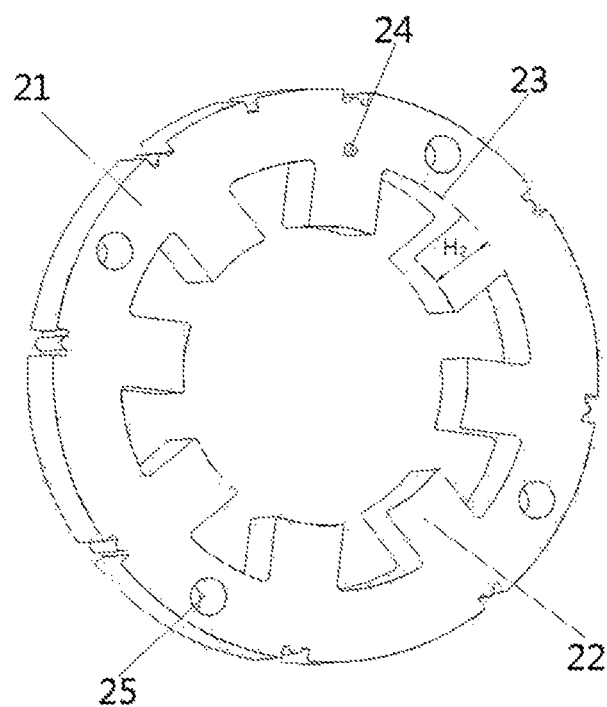
FIG. 5 is a schematic view of the structure of one embodiment of the stator core in the stator assembly of a magnetic suspension bearing of the present disclosure.

In some embodiments, as shown in the schematic view of the front structure of the stator core frame in FIG. 4A and the schematic view of the rear structure in FIG. 4B, each of the tooth insulations 12 comprises: a cladding portion 121 and a blocking portion 122, wherein the cladding portion 121 is a folded sheet structure and having an inner surface configured to be adapted to a circumferential surface of the teeth 22, the first end of the folded sheet structure along a radial direction of the stator core frame 1 is provided on an inner circumference of the annular substrate 11, and the blocking portion 122 is provided on the second end of the folded sheet structure along a radial direction of the stator core frame 1 to block the coils 3 wound on an outer surface of the folded sheet structure. In some embodiments, the teeth 22 of the stator core 2 present a substantially rectangular structure. Correspondingly, the folded sheet structure has an angle of 90 degrees at each fold.

Referring to FIG. 10, a concave portion 18 is provided at the engaged end of one of the stator core frames 1, and a convex portion 19 is provided at the engaged end of the other stator core frame 1. When these two stator core frames 1 engaged with each other, that can realize a more reliable installation by mating the concave portion 18 with the convex portion 19. More specifically, the concave portion 18 and the convex portion 19 are respectively located at the free ends of the cladding portions 121 of the two stator core frames 1.

In some embodiments, the blocking portion 122 is adapted to the folded sheet structure in shape, and the blocking portion 122 is higher than the outer surface of the folded sheet structure in the normal direction of the outer surface of the folded sheet structure, and a cylindrical shape is enclosed by an inner side of each of the blocking portions 122, so that a rotor or other structural members are mounted within the cylindrical shape area.

In some embodiments, a length of the folded sheet structure (FIG. 4A, $H_1$) along the radial direction of the stator core frame 1 is the same as a tooth height (FIG. 5, $H_2$) of the teeth 22. Alternatively, a person skilled in the art may also adjust the length of the folded sheet structure along the radial direction according to the design requirements on the basis of the preferred solution.

Embodiments of the tooth insulation 12 are described in detail above, and embodiments of the groove insulation 13 are described below. As shown in FIG. 4B, the adjacent tooth insulations 12 may be connected by an attachment portion 131, the attachment portion 131 is a sheet-like structure which adapted to the shape of the trough 23, for example a circular arc-shaped structure. Moreover, the trough insulation 13 is formed by the sheet structure and lateral sides of two adjacent tooth insulations 12. In some embodiments, the tooth insulation 12 includes the cladding portion 121 and the blocking portion 122, and the trough insulation 13 is formed by the attachment structure and lateral sides of such two adjacent members as the cladding portion and the blocking portion. In some embodiments, the trough insulation 13 integrally located at the engaged end of the annular substrate 11. Thus it can be seen that, there are several common structures for the tooth insulation portion 12 and the trough insulation 13, because the lateral surfaces of the teeth 22 in the stator core 2 are the lateral surfaces of the trough 23.

When assembling the stator assembly, the two stator core frames 1 may be respectively engaged at both ends of the stator core 2, so that the stator core 2 can be cladded to realize electrical insulation of the stator core 2 from the coils 3. The stator assembly is easy to assemble, and the stator core frame 1 which integrates the functions of the conventional insulating frame structure and the trough sheet, and omits the trough sheet assembling process, can improve the production efficiency. Moreover, after installation, these two stator core frames can be in full fit and firm assembly without the circumstance that the trough sheet is moved and dislocated when the coils are wound, so that it can ensure the reliability of the insulation.

In order to mount the stator core frame 1 on the stator core 2, as shown in FIG. 4B, the stator core frame 1 may comprise an installation positioning pin 17, the installation positioning pin 17 is provided on the annular substrate 11 for mating with a positioning hole 24 on the stator core 2. By using the positioning installation manner, it is possible to achieve quick installation, thereby improving the assembly efficiency, and presenting the fail-safe and fool-proof functions. In order to quickly position and mount the stator core frame 1 at both ends of the stator core 2 and improve the versatility of the portions during the assembly, a positioning hole 24 may be provided respectively at both ends of the stator core 1, and the two positioning holes 24 may be at the same position, i.e. the stator core 2 has the same front-and-back structure. In order to achieve a more reliable fixation, the stator core frame 1 and the stator core 2 may also be fixed by fasteners.

Figure 8:
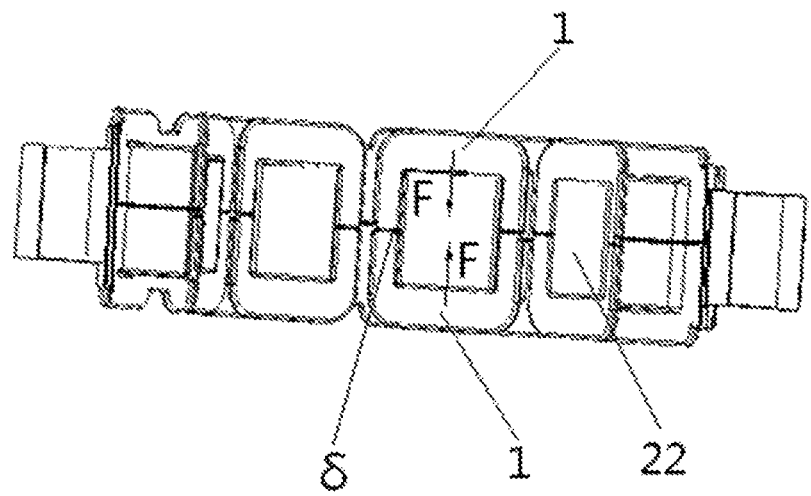
FIG. 8 is a schematic view of the semi-sectional structure of the stator assembly as shown in FIG. 6 before winding.

After the installation of the stator core frame 1, each of the coils 3 may be wound on the outer surfaces of the two cladding portions 121 that are engaged with each other, and the coils 3 are limited by the blocking portion 122. In order to effectuate reliably limiting the coil 3, it is better that the blocking portion 122 is higher than the outer surface of the coils 3. When the coil 3 is wound, according to the same winding direction, as shown in FIG. 8, if the coil 3 uses a copper wire, when the copper wire is wound, an inward pre-tightening force may be applied respectively to the two longitudinal stator core frames 1. During the assembly, it may be ensured that the end faces of the two stator core frames are attached to each other as much as possible, i.e. the gap between the two end faces δ=0, in order to ensure the reliability of the electrical insulation. Of course, in the occasion where there is a low requirement for the insulation level, certain distance between the two end faces may be allowed. FIG. 9 is a schematic view of the semi-sectional structure of the stator assembly after winding; and FIG. 10 is a schematic view of the structure of the sectional coil of the stator assembly after winding. The winding path of the coils 3 can be seen from the two figures.

In some embodiments, in order to achieve a favorable insulation property, the stator core frame 1 of the present disclosure may use PBT+30% GF, PPS, LCP, or PA66 and the like.

Moreover, since the ends of the coil 3 may appear after winding, an insulation frame may be provided with various auxiliary structures such as lead-out troughs, lead-in troughs and threading buckles, and the wiring and connection are both very complicated, which increases the difficulty in assembly and makes the insulation of the stator core from the coils less reliable. Further, in some embodiments, the circuit board 6 is provided at the end of one of the stator core frames 1 for connecting the ends of each coils 3, so that it may not be necessary to provide various auxiliary structures on the stator core frames 1. The structure of the stator core frame 1 can be simplified, and the connection difficulty during the assembly of the stator assembly is reduced, to avoid the problems that the lead-out wire of the stator assembly is in complicated connection and prone to be wrongly connected, thereby further ensuring the insulation reliability of the stator assembly, and enabling to improve the assembly efficiency. In addition, the stator assembly may not require that a wiring trough be opened at the end of the stator core frame 1, which provides the possibility that the two stator core frames 1 are designed in the same structure.

Further, a lead-out hub 5 may also be provided on the circuit board 6. The pins on the lead-out pin holder 5 which correspond to the ends of the respective coils 3, the lead-out pin holder 5 is used to provide an interface for supplying power to the coils 3 by means of the circuit board 6. This may simplify the electrical interface between the stator assembly and the ambient, and may reduce the difficulty caused by the connection over the assembly of the stator assembly, so that the entire stator assembly becomes a standard portion, and it is easy to realize implementation in a product. When in use, only a socket is may be needed to connect with the stator assembly, and there is no need for a cumbersome connection process, which may reduce the probability of wrong connection. At the same time, since no cord is used, a series of electrical problems caused by the wear of the cord mays also be avoided, thereby improving the reliability of the entire system.

Figure 6:
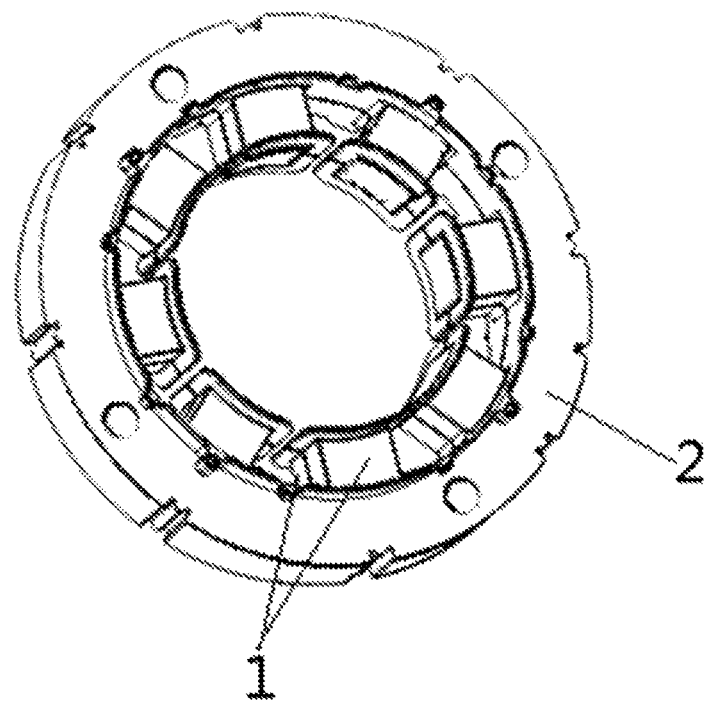
FIG. 6 is a schematic view of the structure of one embodiment of the stator assembly of a magnetic suspension bearing of the present disclosure before winding.
Figure 7:
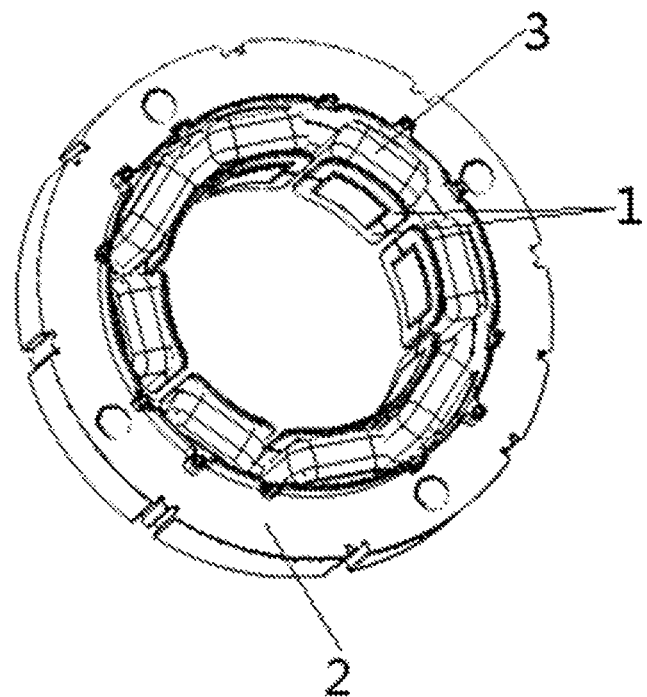
FIG. 7 is a schematic view of the structure of one embodiment of the stator assembly of a magnetic suspension bearing of the present disclosure after winding.

FIG. 6 shows a schematic view of thea structure after the assembly of the stator core frame 1 and the stator core 2 is completed. On such basis, a plurality of groups of coils 3 are further wound and each group of coils 3 is wound on the outer surfaces of the two stator core frames 1 engaged with each other, and corresponds to the teeth 22 of the stator core 2. FIG. 7 shows the state after the winding of the coils is completed.

In order to further improve the reliability of the electrical connection, in some embodiments, as shown in FIG. 4A, a conductive sheet insertion hole 15 is provided at one end of the stator core frame 1 opposite to the engaged end. The conductive sheet insertion hole 15 may be located between two adjacent tooth insulations 12. The stator assembly may comprise a conductive sheet 4 which is provided within the conductive sheet insertion hole 15 to produce an adapting effect, one end of the conductive sheet 4 is connected to the end of the coil 3, and the other end of the conductive sheet 4 is connected to the circuit board 6. After the winding of the coil 3 is completed, the conductive sheet 4 is inserted into the conductive sheet insertion hole 15, and then the ends of the respective coils 3 are sequentially wound on the respective corresponding conductive sheets 4 and fixed with solder. In some embodiments, the conductive sheet 4 may also excluded in use for adaptation, and the lead-out wires of the respective coils 3 may be directly connected to the respective pad holes on the circuit board 6 in sequence.

In order to enable that the circuit board 6 is reliably fixed on the stator core frame 1, a first mounting hole 14 may be provided at one end of the stator core frame 1 opposite to the engaged end, and a second mounting hole 61 may be provided on the circuit board 6 correspondingly, for effectuating fixing the circuit board 6 on the stator core frame 1 by the fasteners passing through the first mounting hole 14 and the second mounting hole 61. In some embodiments, a circuit board positioning pin 16 may also be provided at one end of the stator core frame 1 opposite to the engaged direction, for positioning the circuit board 6 and marking a starting position of the plurality of coils 3. That is, the tooth 22 corresponding to the positioning pin 16 serves as a starting position of the winding. For example, the tooth 22 on which the positioning pin 16 is located is marked as 1# tooth, and the numbering is sequentially made clockwise, so that each tooth 22 is wound with one coil 3.

The present disclosure further provides a method of manufactoring a stator assembly of a magnetic suspension bearing, which may comprise the following steps in one embodiment:

Step 101: engaging two stator core frames 1 respectively at both ends of the stator core 2 along an axial direction thereof. In the mounting process, quick positioning and installation may be performed by the positioning hole 24 on the stator core 2 and the installation positioning pin 17 on the stator core frame 1. In some embodiments, for the stator core frame 1 provided with a concave-convex mated structure, it is necessary to select two stator core frames 1 respectively provided with a concave portion 18 and a convex portion 19, and ensure that the concave portion 18 and the convex portion 19 are in full fit during the assembly.

Step 102: winding the coils 3 on each of a plurality of teeth 22 of the stator core 2 sequentially. In some embodiments, in which the stator core frame 1 is provided with a circuit board positioning pin 16, the coils 3 are sequentially wound on the respective teeth 22 of the stator core 2, starting from the circuit board positioning pin 16.

Step 103: providing a circuit board 6, and connecting ends of each of the coils 3 to the circuit board 6.

Step 104: fixing the circuit board 6 at an outer end of one of the stator core frames 1.

In some embodiments, the steps 103 and 104 may be integrally implemented in two manners: firstly, the ends of the coils 3 are directly welded into the corresponding pad holes of the circuit board 6, and the circuit board 6 is fixed at an outer end of one of the stator core frames 1; secondly, the conductive sheet 4 is inserted into each conductive sheet insertion hole 15 in one of the stator core frames 1, and then the ends of the coils 3 are sequentially wound on the conductive sheet 4, and firmly welded with solder. Afterwards, the circuit board 6 is mounted on the stator core frame 1 by means of the circuit board positioning pin 16, and at the same time the respective conductive sheets 4 are ensured to pass through the corresponding conductive sheet insertion holes 15.

Further, a method of manufacturing the stator assembly of a magnetic suspension bearing according to the present disclosure may further comprise the following step:

Step 105: fixing the lead-out hub 5 on the circuit board 6. The method of manufacturing the stator assembly according to the present disclosure may be relatively simple, and each of the steps ensures the assembling quality of the stator assembly by structural positioning, without introducing cumbersome connection and wiring links, so that it may be possible to avoid the effect caused by artificial factors over the assembling process. Moreover, the assembling efficiency can be improved, so that it is easier to realize implementation in a product and mass production for the stator assembly.

In some embodiments, the stator assembly may be applied to a magnetic suspension bearing. In some embodiments, the magnetic suspension bearing is a radial bearing and may be applied to a motor or other components with requirements for high reliability, long service life, and high rotation speed. The stator assembly of the present disclosure may have the advantages such as simple structure and reliable insulation, and the magnetic suspension bearing using the stator assembly may also possess the corresponding advantages. For example, the excellent versatility of the stator structure greatly reduces the assembling difficulty of the magnetic suspension bearing, so that it is easy to realize the standardization of the magnetic suspension bearing, and the structural reliability of the magnetic suspension bearing can be improved, to avoid that the unstable structure of the insulation frame affects the coil winding process so as to reduce the insulation reliability. Further, the design of the circuit board can improve the reliability of the electrical connection of the magnetic suspension bearing. The design of the lead-out hub can unify the electrical interfaces between the magnetic bearing and the applied members (for example a motor), which avoids the possibility of wrong connection due to artificial mistakes.

The stator assembly of a magnetic bearing and the manufacturing method provided by the present disclosure are described in detail above. Specific embodiments are applied in this text to elaborate the principles and embodiments of the present disclosure, and the aforementioned descriptions of the embodiments are only used to help understanding the method of the present disclosure as well as its core thoughts. It should be set forth that, for a person skilled in the art, on the premise of not divorcing from the principles of the present disclosure, several modifications and decorations may also be made to the present disclosure, and such modifications and decorations also fall into the protection scope of the claims of the present disclosure.

The invention claimed is:

1. A magnetic suspension bearing comprising a stator assembly, wherein the stator assembly of the magnetic suspension bearing comprises:
   a stator core;
   a plurality of coils, each of the coils is wound correspondingly on each of a plurality of teeth of the stator core;
   two stator core frames, respectively engaged at both ends of the stator core along an axial direction thereof, wherein a concave portion is provided at an engaged end of one of the stator core frames, a convex portion is provided at an engaged end of the other of the stator core frames, the concave portion and the convex portion are engaged with each other, and a conductive sheet insertion hole is provided at one end of the stator core frame opposite to the engaged end;
   a circuit board, provided at an outer end of one of the stator core frames to connect an end of each of the plurality of coils and abutting against the stator core frame; and
   a conductive sheet, located in the conductive sheet insertion hole, and with one end connected to the end of the coil and the other end connected to the circuit board;
   wherein, a first mounting hole is provided at one end of the stator core frame opposite to the engaged end, and a second mounting hole is provided on the circuit board, for fixing the circuit board on the stator core frame by fasteners passing through the first mounting hole and the second mounting hole.

2. The magnetic suspension bearing according to claim 1, wherein the concave portion and the convex portion are provided at the engaged end of each of the stator core frames, and an arrangement form of the concave portion and the convex portion on the engaged ends of two stator core frames is the same.

3. The magnetic suspension bearing according to claim 1, wherein the stator core frame comprises an annular substrate and a plurality of tooth insulations provided spacedly on an inner circumference of the annular substrate, wherein each tooth insulation corresponding to one of the teeth on the stator core, for surrounding a circumferential surface of the teeth, and adjacent tooth insulations are connected with each other to form a trough insulation to surround a surface of a trough between adjacent teeth.

4. The magnetic suspension bearing according to claim 3, wherein each of the tooth insulations comprises:
- a cladding portion being a folded sheet structure and having an inner surface configured to be adapted to a circumferential surface of the teeth, a first end of the folded sheet structure along a radial direction of the stator core frame is provided on the inner circumference of the annular substrate; and
- a blocking portion provided on a second end of the folded sheet structure along a radial direction of the stator core frame to block the coils that are wound on an outer surface of the folded sheet structure.

5. The magnetic suspension bearing according to claim 4, wherein the blocking portion is adapted to the folded sheet structure in shape and higher than the outer surface of the folded sheet structure, and a circle is enclosed by an inner side of each of the blocking portions.

6. The magnetic suspension bearing according to claim 4, wherein a length of the folded sheet structure along the radial direction of the stator core frame is the same as a height of the teeth.

7. The magnetic suspension bearing according to claim 3, wherein adjacent tooth insulations are connected by an attachment portion, the attachment portion being a sheet structure adapted to the trough in shape, the trough insulation is formed by the sheet structure and lateral sides of two adjacent tooth insulations.

8. The magnetic suspension bearing according to claim 3, wherein the stator core frame further comprises an installation positioning pin, the installation positioning pin being provided on the annular substrate for mating with a positioning hole on the stator core.

9. The magnetic suspension bearing according to claim 3, wherein each of the coils is wound on outer surfaces of two of the tooth insulations which are engaged with each other.

10. The magnetic suspension bearing according to claim 1, further comprising a lead-out hub, which is provided on the circuit board for providing an interface for supplying power to the coils by means of the circuit board.

11. The magnetic suspension bearing according to claim 1, wherein a circuit board positioning pin is provided at one end of the stator core frame opposite to the engaged end, to position the circuit board.

12. A method of manufacturing the magnetic suspension bearing according to claim 1, comprising steps as follows:
- engaging the two stator core frames respectively at both ends of the stator core along the axial direction thereof;
- winding the coils on each of a plurality of teeth of the stator core sequentially;
- providing the circuit board, and inserting conductive sheets into each conductive sheet insertion hole in one of the stator core frames, and connecting one end of each conductive sheet with the coil and another end of each conductive sheet with the circuit board, so as to connect ends of each of the coils to the circuit board; and
- passing a fastener through the first mounting hole and the second mounting hole, so as to fix the circuit board on an outer end of one of the stator core frames and make the circuit board abut against the stator core frame.

* * * * *